(12) United States Patent
Pal et al.

(10) Patent No.: US 9,962,983 B2
(45) Date of Patent: May 8, 2018

(54) PRINTABLE RECORDING MEDIA

(71) Applicant: Hewlett-Packard Development Company, L.P., Fort Collins, CO (US)

(72) Inventors: Lokendra Pal, San Diego, CA (US); Jason Swei, San Diego, CA (US); Rajasekar Vaidyanathan, San Diego, CA (US); Silke Courtenay, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/119,536

(22) PCT Filed: Mar. 31, 2014

(86) PCT No.: PCT/US2014/032316
§ 371 (c)(1),
(2) Date: Aug. 17, 2016

(87) PCT Pub. No.: WO2015/152862
PCT Pub. Date: Oct. 8, 2015

(65) Prior Publication Data
US 2017/0066270 A1 Mar. 9, 2017

(51) Int. Cl.
*B41M 5/00* (2006.01)
*B41M 5/52* (2006.01)
(Continued)

(52) U.S. Cl.
CPC .................. *B41M 5/52* (2013.01); *B41J 2/01* (2013.01); *B41M 5/502* (2013.01); *B41M 5/506* (2013.01);
(Continued)

(58) Field of Classification Search
CPC ...... B41M 5/502; B41M 5/508; B41M 5/506; B41M 5/5218; B41M 5/5227; C04B 20/10
See application file for complete search history.

(56) References Cited

U.S. PATENT DOCUMENTS 5,298,335 A 3/1994 Reed et al.
5,725,648 A 3/1998 Brown et al.
(Continued)

FOREIGN PATENT DOCUMENTS

EP 2218821 8/2010
EP 2402167 1/2012
WO 2012148404 11/2012

OTHER PUBLICATIONS

International Search Report dated Dec. 22, 2014 for PCT/US2014/032316, Applicant Hewlett-Packard Development Company, L.P.
(Continued)

*Primary Examiner* — Betelhem Shewareged
(74) *Attorney, Agent, or Firm* — HP Inc. Patent Department (57) ABSTRACT

A printable recording media containing a substrate; a pre-coat layer including more than about 60 wt % of one or more inorganic pigments by total dry weight of the pre-coat layer; a topcoating layer including more than about 60 wt % of one or more inorganic pigments; up to 25 wt % of binders and up to about 5 wt % of a combination of natural and synthetic rheology modifiers, by total weight of the top-coating layer, wherein the ratio of the amount of natural rheology modifiers to the amount of synthetic rheology modifiers is from about 90:10 to about 50:50. Also disclosed herein is a method for making such printable recording media.

15 Claims, 1 Drawing Sheet

(51) Int. Cl.
  *B41M 5/50*   (2006.01)
  *B41J 2/01*   (2006.01)
  *C04B 20/10*  (2006.01)

(52) U.S. Cl.
  CPC .......... *B41M 5/508* (2013.01); *B41M 5/5227* (2013.01); *B41M 5/5218* (2013.01); *B41M 5/5236* (2013.01); *B41M 2205/34* (2013.01); *B41M 2205/38* (2013.01); *C04B 20/10* (2013.01)

(56) References Cited

U.S. PATENT DOCUMENTS

| | | | |
|---|---|---|---|
| 5,764,248 A * | 6/1998 | Scarpetti | C09D 11/328 347/2 |
| 6,458,888 B1 | 10/2002 | Hood et al. | |
| 7,217,443 B2 | 5/2007 | Bobsein et al. | |
| 8,128,744 B2 | 3/2012 | Luer et al. | |
| 8,129,033 B2 | 3/2012 | Tammi | |
| 2006/0010619 A1 * | 1/2006 | Hees | D06M 15/3562 8/445 |
| 2006/0065161 A1 | 3/2006 | Miller | |
| 2006/0246239 A1 * | 11/2006 | Chen | B41M 5/5218 428/32.34 |
| 2010/0304057 A1 * | 12/2010 | Zeng | B41M 5/5218 428/32.37 |
| 2011/0008542 A1 | 1/2011 | Zeng et al. | |
| 2011/0052818 A1 | 3/2011 | Osterberg et al. | |
| 2011/0069107 A1 | 3/2011 | DeWyngaert, III | |
| 2013/0071679 A1 | 3/2013 | Anquetil et al. | |
| 2013/0156953 A1 | 6/2013 | Sarkisian et al. | |
| 2013/0257990 A1 * | 10/2013 | Swei | B41M 5/502 347/47 |

OTHER PUBLICATIONS

Extended European Search Report dated Apr. 4, 2017 for PCT/US2014/032316, Applicant Hewlett-Packard Development Company, L.P.

* cited by examiner

PRINTABLE RECORDING MEDIA

BACKGROUND

Inkjet printing is a non-impact printing method in which an electronic signal controls and directs droplets or a stream of ink that can be deposited on a variety of substrates. Current inkjet printing technology involves forcing the ink drops through small nozzles by thermal ejection, piezoelectric pressure or oscillation, onto the surface of a media. This technology has become a popular way of recording images on various media surfaces, particularly paper, for a number of reasons, including low printer noise, capability of high-speed recording and multi-color recording. Inkjet web printing is a technology that is specifically well adapted for commercial and industrial printing.

Though there has been great improvement in high-speed inkjet printing, improvements are followed by increased demands regarding higher resolution, increased durability and ability to print on specific recording substrates. The printable recording media that are used on these printing processes should have thus excellent properties: they should be able, for example, to have a fast ink absorption (which enables fast drying in a short dryer unit with elevated temperature) while, at the same time, generating an excellent image quality.

BRIEF DESCRIPTION OF THE DRAWINGS

The drawings illustrate various examples of the present recording media and are part of the specification.

DETAILED DESCRIPTION

A printable recording media comprising a substrate; a pre-coat layer including more than about 60 wt % of one or more inorganic pigments by total dry weight of said pre-coat layer; a top-coating layer including more than about 60 wt % of one or more inorganic pigments; up to 25 wt % of binders and up to about 5 wt % of a combination of natural and synthetic rheology modifiers, by total weight of the top-coating layer, wherein the ratio of the amount of natural rheology modifiers to the amount of synthetic rheology modifiers is from about 90:10 to about 50:50. The present disclosure refers also to a method for making such printable recording media and to a method for producing printed images using said recording media.

Before particular examples of the present disclosure are disclosed and described, it is to be understood that the present disclosure is not limited to the particular process and materials disclosed herein. It is also to be understood that the terminology used herein is used for describing particular examples only and is not intended to be limiting, as the scope of protection will be defined by the claims and equivalents thereof. In describing and claiming the present media and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. The percent are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

The printable recording media, described herein, provides printed images and articles that demonstrate excellent image quality (good bleed and coalescence performance) and enhanced durability performance while enabling high-speed and very high-speed printing. By high-speed printing, it is meant herein that the printing method can be done at a speed of 50 fpm or higher. As durability performance, it is meant herein that the resulting printed images are robust to dry and wet rubbing that can be done by going through printing and finishing operations (web transporting, turn bar, rewinding, slitting, sheeting, folding, etc.) or by the user handling.

In addition, the printable recording media provides printed images that have, in the same time, an excellent gloss and a high absorptivity. The resulting printed article and image have, therefore, outstanding print quality. In some examples, the resulting printed images, obtained from the method described herein, have a high degree of gloss, good black optical density, excellent durability and print quality. High print density and color gamut volume are realized with substantially no visual color-to-color bleed and with good coalescence characteristics.

The printable recording media provides printed images that do not show visible print mottle. Print mottle or mottling is a defect that often presents as uneven random color patterns in a large area of an image. It is believed that uneven absorption of ink vehicle in the coating layer causes this defect, a result of uneven coat weight/thickness on base paper, and/or variation of pore structure in the coating layer. For coated paper, the underneath base paper is usually rougher than the final sheets. During coating process, the thickness of the coating layer may vary with any bumps and valleys on the base paper surface. Even with precise coating methods, there is often uneven coating thickness across the web. Since the absorption of liquid in coating layer is different than absorption in the base paper, variation of the coat weight is a major cause of print mottle. In addition, coated paper usually goes through a calender or super calender step after the coating process in order to produce a smother surface and/or higher gloss products. Under pressure and/or high temperature, the pores in the coating layer will deform. Due to uneven base paper and variation of coating thickness, calendering can easily cause differences in pore structure, i.e., patterns of pore size distribution and pore shape. Such differences might, in many cases, cause variation of ink penetration rate in the coating layer, and eventually exacerbate a print mottle defect. In addition, the printable recording media has, in the same time, excellent surface smoothness and a high absorptivity. The resulting printed article and image have, therefore, outstanding print durability and print quality.

In some examples, the printable recording media described herein is a coated dull media that can print at speeds needed for commercial and other printers such as, for example, a Hewlett Packard (HP) Inkjet Web Press (Hewlett Packard Inc., Palo Alto, Calif., USA). The properties of such printable recording media are comparable to coated media for offset printing.

The printable media has a fast absorption rate. By "fast absorption rate", it is meant that the water, solvent and/or vehicle of the ink can be absorbed by the media at a fast rate so that the ink composition does not have a chance to interact and cause bleed and/or coalescence issues. The absorption rate that defects free printing is dependent on the speed of the printing and amount of ink being used. The faster the printing speed and the higher the amount of ink used, the higher is the demand on faster absorption from the media. A good diagnostic plot with maximum ink density, such as secondary colors, would be prone to coalescence and a pattern of lines of the primary and secondary colors passing through area fills of primary and secondary colors would be prone to bleed. If no bleed or coalescence is present at the desired printing speed, the absorption rate would be sufficient. Bristow wheel measurements can be used for a quantitative measure of absorption on media wherein a fixed amount of a fluid is applied through a slit to a strip of media that moves at varying speeds.

The printable media, as described herein, can also be considered as an article or as a coated article. The article comprises several layers or coated layers. In some examples, the present disclosure refers to an article comprising a first layer including inorganic pigments and a second layer including from about 0.1 wt % to 1.5 wt % of a combination of hydroxy-ethylcellulose and modified alkali soluble emulsion polymer systems, by total weight of said second layer, wherein the ratio of the amount of hydroxy-ethylcellulose to the amount of modified alkali soluble emulsion polymer systems is from about 85:15 to about 70:30.

Figure 1:
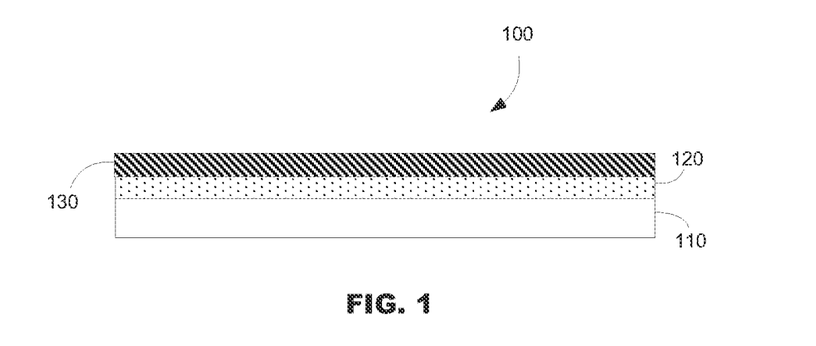
FIGS. 1 and 2 are cross-sectional views of the printable recording media according to examples of the present disclosure.
Figure 2:
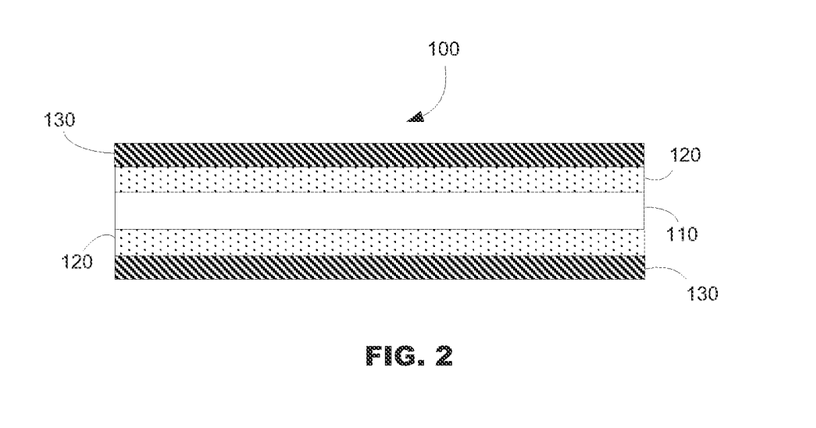

FIG. 1 and FIG. 2 illustrate the printable recording media (100) as described herein. As illustrated in FIG. 1, the printable media (100) encompasses a bottom substrate (110), a pre-coat layer (120) and a top-coating layer (130). The pre-coat layer (120) is applied on one side of the bottom substrate (110). The top-coating layer (130) is applied over the pre-coat layer (120). If said coated side is used as an image-receiving side, the other side, i.e. backside, may not have any coating, or may be coated with other chemicals (e.g. sizing agents) or coatings to meet certain features such as to balance the curl of the final product or to improve sheet feeding in printer. In some examples, such as illustrated in FIG. 2, the pre-coat layer (120) and the top-coating layer (130) are applied to both opposing sides of the substrate (110). The double-side coated media has thus a sandwich structure, i.e. both sides of the substrate (110) are coated with the same coating and both sides may be printed.

An amount of the pre-coat layer and an amount of the top-coating layer on the print media in the dry state is, at least, sufficient to hold the ink that is to be applied to the print media. The substrate (110) can have a thickness along substantially the entire length ranging between about 0.025 mm and about 0.5 mm.

In some examples, the pre-coat layer (120) is disposed on the substrate (110) and forms a coating layer having a coat-weight in the range of about 1 to about 30 gram per square meter (g/m$^2$ or gsm) per side, or in the range of about 5 to about 20 gsm, or in the range of about 8 to about 15 gsm per side. In some examples, the top-coating layer (130) is disposed on the substrate (110), above the pre-coat layer (120), and forms a coating layer having a coat-weight which is above 5 gsm (gram per square meter or g/m$^2$) per side, or, in some other examples, which is above 15 gsm (gram per square meter) on, at least, one side of the media. In yet some other examples, the top-coating layer (130) has a coat-weight in the range of about 10 to about 30 gsm. The printable recording media can have a pre-coat layer, on a side of the printable recording media, with a coat-weight of about 5 to about 20 gsm and a top-coating layer, on the same side of the printable recording media, with a coat-weight of about 10 to about 20 gsm.

In some examples, the printable recording media used herein is a coated glossy medium that can print at speeds needed for commercial and other printers such as, for example, a Hewlett Packard (HP) Inkjet Web Press (Hewlett Packard Inc., Palo Alto, Calif., USA). The properties of the print media in accordance with the principles described herein are comparable to coated media for offset printing. The printable recording media can have a 75o gloss (sheet gloss) that is greater than 60%; or that is greater than 65%. Such gloss is referred as the "Sheet Gloss" and measures how much light is reflected with a 75 degree (o) geometry on the unprinted recording media. 75® Sheet Gloss testing is carried out by Gloss measurement of the unprinted area of the sheet with a BYK-Gardner Micro-Gloss® 75o Meter (BYK-Gardner USA, Columbia, Md., USA).

The Substrate

As illustrated in FIG. 1, the printable media (100) contains a substrate (110) that supports a pre-coat layer (120) and a top-coating layer (130) and that acts as a bottom substrate layer. The substrate is a media substrate or media supporting base. Such substrate (i.e. supporting material or base substrate) can be considered as a base print substrate or as a supporting substrate (supporting base) that contains a material that serves as a base, or support, upon which the pre-coat layer and the top-coating layer are applied. The substrate provides integrity for the resultant printable media.

The substrate, or base substrate, or supporting material, or print media substrate, may include any materials which can support a coating composition. Such material can be, for example, natural materials, such as cellulose fibers, or synthetic material, synthetic polymeric fibers, or non-fabric materials such as a polymeric film, or a mixture of them. The substrate material has good affinity and good compatibility for the ink that is applied to the material.

Examples of substrates include, but are not limited to, natural cellulosic material, synthetic cellulosic material (such as, for example, cellulose diacetate, cellulose triacetate, cellulose propionate, cellulose butyrate, cellulose acetate butyrate and nitrocellulose), material including one or more polymers such as, for example, polyolefins, polyesters, polyamides, ethylene copolymers, polycarbonates, polyurethanes, polyalkylene oxides, polyester amides, polyethylene terephthalate, polyethylene, polystyrene, polypropylene, polycarbonate, polyvinyl acetal, polyalkyloxazolines, polyphenyl oxazolines, polyethylene-imines, polyvinyl pyrrolidones, and combinations of two or more of the above. In some examples, the substrate includes a paper base including paper, cardboard, paperboard, paper laminated with plastics, and paper coated with resin. The substrate may include binders. Such binders are polymeric binders and may be included, for example, when non-cellulose fibers are used. The substrate may include cellulose fibers and synthetic fibers. The cellulose fibers may be made from hardwood or softwood species. The fibers of the substrate material may be produced from chemical pulp, mechanical pulp, thermal mechanical pulp, chemical mechanical pulp or chemical thermo-mechanical pulp. Examples of wood pulps include, but are not limited to, Kraft pulps and sulfite pulps, each of which may or may not be bleached. Examples of softwoods include, but are not limited to, pine, spruce and hemlock. Examples of hardwoods include, but are not limited to, birch, maple, oak, poplar and aspen. The synthetic fibers may be made from polymerization of organic monomers. The substrate may also include non-cellulose fibers. The substrate may also include a surface or a film coating layer. The surface or film coating layer may encompass a mixture of inorganic fillers, polymeric binders or other performance and functional additives such as dispersant, optical brighteners or dyes for examples.

The basis weight of the substrate is dependent on the nature of the application of the print media where lighter weights are employed for magazines, books and brochures and heavier weights are employed for post cards and packaging applications, for example. In some examples, the substrate has a basis weight of about 60 grams per square meter (g/m2 or gsm) to about 400 gsm, or about 90 gsm to about 250 gsm.

The Pre-Coat Layer

The printable media contains a pre-coat layer (120) disposed onto the substrate (110). The pre-coat layer (120) can also be considered as a first layer or as a first coating layer (120). Without being limited by any theory, it is believed that said pre-coat layer or first layer is designed to provide a "high" absorption rate of the inks that is deposited thereon and thus allow good bleed and coalescence performance. In some examples, the pre-coat layer or first layer can be considered as an ink-receiving layer. Furthermore, it is believed that the pre-coat layer is designed to reduce the roughness of the substrate, and help to create a "uniform" coating layer, that will reduce the print image mottle. In some example, said pre-coat layer (120) is present on, at least, one side of the substrate. In some other examples, the pre-coat layer (120) is present on both sides of the substrate.

The pre-coat layer (120) contains more than about 60 wt % of one or more inorganic pigments by total dry weight of said pre-coat layer. In some other examples, the pre-coat layer (120) contains more than about 80 wt % of one or more inorganic pigments by total dry weight of the pre-coat layer. The pre-coat layer (120) can include inorganic pigments and, at least, one binder. In some examples, the inorganic pigments are particulate inorganic pigments. Particulate inorganic pigments means herein that said inorganic pigments are present, in the layer, in the form of particle (i.e. in a particulate form)

In some examples, the average particle size of the particulate inorganic pigments, that are present in the pre-coat layer (120), is in the range of about 0.3 to about 10 microns (µm). "Particle size" refers to the diameter of a particle as if the particle were spherical. "Average particle size" refers to the sum of the sizes of the particles divided by the total number of particles.

The inorganic pigments, present in the pre-coat layer (120) can be precipitated calcium carbonate, modified calcium carbonate, ground calcium carbonate, kaolin clay, hydrated clay, engineered clay, delaminated clay, calcined clay or a mixture of any of them. The inorganic pigments, present in the pre-coat layer (120) can also be calcined clay, ultra-fine precipitated calcium carbonate, modified calcium carbonate, ground calcium carbonate or combinations thereof. In some examples, the inorganic pigments, present in the pre-coat layer (120), are combinations of calcined clay and precipitated calcium carbonate. In some other examples, the inorganic pigments, present in the pre-coat layer (120), are combinations of calcined clay and ground calcium carbonate.

The inorganic pigment, by way of illustration and not limitation, can be Kaocal® calcined clay (particle size distribution of about 83-92% particles finer than 2 µm) (from Thiele Kaolin Company, Sandersville Ga.); Omyajet® B5260 ultrafine precipitated calcium carbonate (average particle size of about 2.4 µm) (from Omya Inc., Florence Vt.); a mixture of Kaocal® calcined clay and Opacarb® A40 (precipitated calcium carbonate, median particle size of about 0.4 µm) (from Specialty Minerals); or a mixture of Kaocal® calcined clay and Hydrocarb® 60 fine ground calcium carbonate (average particle size of about 1.5 µm) (from Omya Inc.) wherein the mixture contains, by dry weight, at least about 50%, or at least about 60%, of Kaocal® calcined clay, for example. It is believed that higher level of calcined clay provides higher absorption for bleed control at high speed printing. The second pigment particulate can be added to help improve the coating application process.

In some examples, the pre-coat layer further includes one or more binders in an amount representing from of about 2 wt % to about 25 wt % or, in some other example, in an amount representing from about 5 wt % to about 15 wt % by total dry weight of the pre-coat layer. The binders can be defined as polymeric binders. Such polymeric binders are water-soluble or water-dispersible binders or a combination thereof.

Examples of binder include but are not limited to polyvinyl alcohol or derivatives thereof, polyethylene glycol or derivatives thereof, polyurethane, polyvinylpyrrolidone, starch or derivatives thereof, gelatin or derivatives thereof, cellulose or derivatives thereof, maleic anhydride polymers or copolymers, acrylic ester polymer and copolymers, polymethylacrylate or copolymers, polyacrylamide, latex resin materials based on polymers or copolymers of styrene butadiene, acrylic, styrene acrylic, styrene methylacrylate, styrene acrylonitrile, styrene/maleic anhydride, vinyl acrylic, vinyl acetate, vinyl esters, vinyl ethers, or a mixture of any of them. The polymeric binder may be, but is not limited to, latex polymers, polyvinyl alcohols and polyvinyl pyrrolidones. The latex polymer may be derived from a number of monomers such as, by way of example and not limitation, vinyl monomers, allylic monomers, olefins, and unsaturated hydrocarbons, and mixtures thereof. Classes of vinyl monomers include, but are not limited to, vinyl aromatic monomers (e.g., styrene), vinyl aliphatic monomers (e.g., butadiene), vinyl alcohols, vinyl halides, vinyl esters of carboxylic acids (e.g., vinyl acetate), vinyl ethers, (meth) acrylic acid, (meth)acrylates, (meth)acrylamides, (meth) acrylonitriles, and mixtures of two or more of the above, for example. The term "(meth)acrylic latex" includes polymers of acrylic monomers, polymers of methacrylic monomers, and copolymers of the aforementioned monomers with other monomers. In some examples, the binder is a hydroxyethyl corn starch, such as, for examples, Clineo 715 (available from ADM). In some examples, the binder is a thermally modified corn starch, such as, for examples, C-Film® 7311 (available from Cargill).

In some examples, the binder is a latex polymeric binder. Examples of vinyl aromatic monomers that may form the latex polymeric binder include, but are not limited to, styrene, 3-methylstyrene, 4-methylstyrene, styrene-butadiene, p-chloro-methylstyrene, 2-chlorostyrene, 3-chlorostyrene, 4-chlorostyrene, divinyl benzene, vinyl naphthalene and divinyl naphthalene. Vinyl halides that may be used include, but are not limited to, vinyl chloride and vinylidene fluoride. Vinyl esters of carboxylic acids that may be used include, but are not limited to, vinyl acetate, vinyl butyrate, vinyl methacrylate, vinyl 3,4-dimethoxybenzoate, vinyl malate and vinyl benzoate. Examples of vinyl ethers that may be employed include, but are not limited to, butyl vinyl ether and propyl vinyl ether, for example.

In some examples, the binder is a styrene/butadiene latex copolymer. In some other examples, the binder is a carboxylated styrene butadiene latex copolymer. In yet some other examples, the binder is a mixture of hydroxyethyl corn starch and of styrene/butadiene latex copolymer.

The binder can be, but is not limited to, Gencryl® 9525 styrene/butadiene/acrylonitrile copolymer (from Rohm-Nova, Akron Ohio), Gencryl®9750 styrene/butadiene/acrylonitrile (from RohmNova), STR 5401 styrene/butadiene (from Dow Chemical Company, Midland Mich.), Mowiol®4-98 polyvinyl alcohol (Kuraray America, Inc., Houston Tex.), Acronal® S728 aqueous dispersion of a styrene/n-butyl acetate polymer (available from BASF), GenFlo® specialty latex products (from Omnova), for example, or a combination of two or more of the above.

Other components that may be present in a composition for forming a pre-coat layer in accordance with the principles described herein include one or more additives affecting various properties of the composition. The additives include, but are not limited to, one or more of thickening agents, cross-linking agents, surfactants, defoamers, optical brighteners, dyes, pH controlling agents or wetting agents, and dispersing agents, for example. The total amount, by weight, of additives, in the composition for forming the pre-coat layer, can be from about 0.1 wt % to about 5 wt %, or from about 0.2 wt % to about 3 wt %, by total dry weight of the pre-coat layer.

A combination of a particle size and a coat-weight of the pre-coat and top-coating layer, on the printable recording media, yields to pore size distribution in the range of about 0.025 microns (μm) to about 1.0 microns (μm). In some examples, the pore size distribution is in the range of about 0.05 microns (μm) to about 0.5 microns (μm). In some other examples, the pore size distribution is in the range of about 0.08 microns (μm) to about 0.3 microns (μm). The phrase "pore size" refers to the pores that are formed by a particulate inorganic pigment associated with a substrate. The pores are formed by a combination of an average particle size of the particulate inorganic pigment, a particle size distribution of the particulate inorganic pigment and a coat-weight of the particulate inorganic pigment. "Particle size distribution" refers to the percentage of particles falling within a particular size range. For purposes of illustration and not limitation, an example is a particle size distribution where about 75% to about 85% of the particles have a particle size in a range of about 1.0 to about 1.4 microns (μm).

The Top-Coating Layer

The printable media contains a top-coating layer (130). The top-coating layer (130) is disposed over the pre-coat layer (120). Said top-coating layer (130) can be present on, at least, one side or on both sides of the printable media (100). The top-coating layer (130) can also be considered as a second layer or as a second coating layer (130). Without being limited by any theory, it is believed that said top-coating layer (or top-coat layer or second layer) is designed to provide a high gloss to the media and to give good holdout of the ink that allow for high gamut, dark blacks, and excellent image gloss. Such top-coating layer could be considered as a top-coating layer, or ink-receiving layer, as the layer will receive the ink and will allow the formation of the printed image. The top-coating layer (130) includes more than about 60 wt % of one or more inorganic pigments by total weight of the top-coating layer; up to 25 wt % of binders by total weight of the top-coating layer and up to about 5 wt % of a combination of synthetic and natural rheology modifiers by total weight of the top-coating layer.

The top-coating layer encompasses natural and synthetic rheology modifiers present in an amount ranging from about 0.01 to about 5 wt % by total weight of the top-coating layer. In some other examples, the rheology modifiers are present in an amount ranging from about 0.1 wt % to 1.5 wt % by total weight of the top-coating layer. In yet some other examples, the rheology modifiers are present in an amount ranging from about 0.3 wt % to 1 wt % by total weight of the top-coating layer.

The ratio of the amount of natural rheology modifiers to the amount of synthetic rheology modifiers is from about 90:10 to about 50:50. In some other examples, the ratio of the amount of natural rheology modifiers to the amount of synthetic rheology modifiers is from of about 85:15 to about 70:30.

Rheology modifiers (or rheological additives or thickeners) are chemical components which modify a liquid system's rheological properties, such as water retention, viscosity and response to shear affecting coating operation and product performance characteristics. A coating layer without rheology modifiers can have poor rheology due to inferior water retention values (WRV) and viscosities (low and high shear) resulting in binder migration, uneven coat weight (i.e. uneven coating thickness) and moisture streaks during coating process causing issues such as print mottle and coalescence. Indeed, without being bound by any theory, it is believed that coating layers with calcined clay often show poor rheology performances due to its porous structure while having excellent absorption performances. (Calcined clay is produced by high temperature heat treatment in order to provide porous aggregates of pigment particles). It is believed that the combination of poor rheology of top-coating layer and faster water pickup by pre-coat layer from the time of the application to drying, can cause extensive coating dewatering affecting surface (texture and appearance) and print (mottle) properties. The calendering operation under pressure and/or high temperature can further magnify differences in pore structure (i.e. patterns in pore size distribution and pore shape) due to uneven coat weight/thickness and moisture streaks in the web from coating process. Such differences might, in many cases, cause variation of ink penetration rate in the coating layer, and eventually exacerbate a print mottle defect.

The rheology modifiers that are present in the top-coating layer are water soluble, water-dispersible or water-emulsifiable polymers. The rheology modifiers that are present in the top-coating layer are combinations of natural rheology modifiers and synthetic rheology modifiers. Without being bound by any theory, it is believed that such combination helps to improve coating layer rheology by improving water retention values (WRV), low shear viscosity (Brookfield viscosity) and high shear viscosity (Hercules Hi-Shear viscosity).

By natural rheology modifier additives, it is meant herein rheology modifiers that are of a natural origin and their derivatives (including organic and inorganic natural species). Natural rheology modifiers include, for example, natural polysaccharides, amino acid based material, alginate, proteins, guar gum, pectin, and xanthan gum. The derivatives of natural rheology modifiers refers to a chemical compound which are natural species such as polysaccharides as a backbone structure but their functional groups are substituted and/or modified synthetically. The examples of such derivatives are, for examples, carboxy methyl cellulose, hydroxy ethyl cellulose, hydroxyl propyl cellulose, hydroxyl propyl methyl cellulose, alginate, sodium alginate. In some examples, the natural rheology modifier additives are hydroxy-ethylcelluloses. In some other examples, the natural rheology modifier additives are hydrophobically modified hydroxy ethyl celluloses (HMHEC) or other derivatives of cellulose.

By synthetic rheology modifier additives, it is meant herein rheology modifiers that are of a synthetic origin (organically or inorganically). Synthetic rheology modifiers includes, for examples, acrylates polymer such as polyacrylates swellable emulsion (ASE) or hydrophobically modified alkali soluble emulsion (HASE) polymer systems. ASE are non-associative thickeners while HASE are associative thickeners. The water retention and thickening properties can be balanced by altering the number of hydrophilic and hydrophobic functional groups present in the ASE and HASE polymers. Useful synthetic rheology modifier include also, for example, hydrophobically modified ethoxylated urethanes (HEUR), hydrophobically-modified polyether (HMPE), fumed silica, precipitated silica and chemically grafted silica. In some examples, the synthetic rheology modifiers, in the top-coating layer, are hydrophobically modified alkali soluble emulsion polymer systems.

The rheology modifiers, that are present in the top-coating layer, are combinations of natural and synthetic rheology modifiers (i.e. form a dual rheology modifier system). The rheology modifiers can be combination of natural and synthetic rheology modifiers wherein the natural rheology modifiers are hydroxy-ethylcelluloses. The rheology modifiers can also be combination of natural and synthetic rheology modifiers wherein the synthetic rheology modifiers are hydrophobically modified alkali soluble emulsion (HASE) polymer systems.

In some examples, the rheology modifiers are combination of hydroxy-ethylcellulose as natural rheology modifiers and hydrophobically modified alkali soluble emulsion (HASE) polymer systems as synthetic rheology modifiers.

In some other examples, the rheology modifiers are combination of hydroxy-ethylcellulose as natural rheology modifiers and hydrophobically modified alkali soluble emulsion (HASE) polymer systems as synthetic rheology modifiers, wherein the ratio natural/synthetic rheology modifiers is from about 85:15 to about 70:30.

The synthetic rheology modifiers can be "waterborne" acrylic based thickeners such as EkaFlow® L series available from AlzoNobel. The synthetic rheology modifiers can also be a Polyacrylate polymer such as EkaFlow® L265 available from AlzoNobel. The natural rheology modifiers can be, for example, 2-Hydroxyethyl Cellulose having an average molecular weight of about 720,000 and can be available form Sigma Aldrich. Such natural rheology modifiers can also be Cellosize® (available from Dow), Natrosol® (available from Ashland Inc.).

In some examples, the top-coating layer (130) encompasses one or more inorganic pigments and up to 25 wt % of binders. The top-coating layer contains more than about 60 weight percent of inorganic pigments total dry weight of said top-coating layer can contain up to 90 weight percent of inorganic pigments total dry weight of said coating layer. In some examples, inorganic pigments are particulate inorganic pigments.

Inorganic pigments suitable for the top-coating layer, include clay, calcined clay, precipitated calcium carbonate, ground calcium carbonate, dolomite, aluminum silicate, mica, magnesium carbonate, silica, alumina, boehmite, talc, and combinations of two or more of the above, for example, with the above average particle size and particle size distribution set forth above. In some examples, the inorganic pigment, that are present in the top-coating layer, are calcium carbonate, calcined clay or kaolin clay.

The inorganic pigment of the top-coating layer, by way of illustration and not limitation, can be Omyaprime® HG30 calcium carbonate (average particle size of about 0.27 μm) (from Omya Inc.); Opacarb A40 precipitated calcium carbonate (median particle size of about 0.4 μm) (from Specialty Minerals Inc., Bethlehem Pa.), Hydrafine® 90W fine clay (about 90%-96% particles finer than 2 μm) (from KaMin LLC, Sandersville Ga.); and combinations of the above, for example.

The average particle size or the median particle size of the inorganic pigment of the top-coating layer can be in the range of about 0.2 to about 1.5 μm, or in the range about 0.4 to about 1 micron. The particle size distribution applies to any of the average particle sizes or median particle sizes or particles size ranges set forth above for the particulate inorganic pigment of the top-coating layer. For example, by way of illustration and not limitation, a particulate inorganic pigment with an average particle size of about 1.2 μm may have a particle size distribution where particles in the range of about 1 micron to about 4 μm are about 80% of the particles of the pigment.

The top-coating layer can comprise at least two different inorganic pigments. In some examples, the top-coating layer comprises a mixture of about 30 to about 90 wt % of a first pigment including calcium carbonate particles and about 10 to about 70 wt % of a second pigment having a larger size and a different shape than said first pigment particles, wherein said weight percentages are by combined weight of the first and second pigments by total dry weight of said top-coating layer. In some examples, the first pigment includes precipitated calcium carbonate particles.

A first pigment, present in the top-coating layer (130), can be, for examples, precipitated calcium carbonate (PCC) particles with narrow size-distribution. Such precipitated calcium carbonate (PCC) particles can have an average particle size of less than 1 micron, or less than about 400 nm or even smaller. PCC particles, in the specified size ranges, may be prepared in accordance with methods that are described in the literature, such as, for example, in the Chapter 2, of "The Coating Processes" (edited by J. C. Walter, Tappi Press, Atlanta, Ga., 1993). The first pigment can be, for examples, Opacarb® A40 (from BASF).

A second pigment, that is present in the top-coating layer (130), can have a different shape and particle size, compared to the PCC particles. Without wishing to be limited to any theory, it is believed that inclusion of the second pigment disrupts the packing structure of PCC particles in coating layer, creating voids between particles that enhance the flow and storage of liquid. The second pigment can be a ground calcium carbonate (GCC) pigment, or clay pigment such as kaolin clay, hydrated clay, calcined clay, or other material that is capable of functioning in a similar manner. In some examples, the second pigment has a larger particle size and a different shape than the PCC pigment. In some examples, the average particle size of the second pigment is in the range of about 0.5 to about 10 μm. In certain instances, the second pigment's size is in the range of about 0.5 to about 5 μm, and, in some cases, in the range of about 0.8 to about 2 μm in size. Ground calcium carbonate (GCC) and platey clay particles, in the specified size ranges, may be prepared in accordance with methods that are, for example, as described in Chapter 2, in "The Coating Processes" (edited by J. C. Walter, Tappi Press, Atlanta, Ga., 1993). The second pigment, present in the top-coating layer (130), can be a clay pigment, such as a clay pigment with a high aspect ratio, sometimes referred to as "platey clay." Platey clays have a planar shape, with dimensions ranging from submicron up to several microns, or even up to more than 10 microns. In some other examples, the second pigment is calcined clay. In yet some other examples, the second pigment is a combination of ground calcium carbonate (GCC) particles and platey clay. The weight ratio between GCC particles and platey clay can be in the range of from 1:5 to 5:1.

The top-coating layer can comprise a mixture of about 30 to about 90 wt % of a first pigment including precipitated calcium carbonate particles and about 10 to about 70 wt % of calcined clay as a second pigment wherein said weight percentages are by combined weight of the first and second pigments by total dry weight of said top-coating layer. The top-coating layer can also comprise a mixture of about 30 to about 90 wt % of a first pigment including ground calcium carbonate particles and about 10 to about 70 wt % of calcined clay as a second pigment wherein said weight percentages are by combined weight of the first and second pigments by total dry weight of said top-coating layer. In some examples, the inorganic pigments present in the pre-coat layer are combinations of calcined clay and ground calcium carbonate. In some other examples, the inorganic pigments present in the pre-coat layer are combinations of calcined clay and precipitated calcium carbonate.

The top-coating layer (130) may further comprise a third pigment particle. The third pigment can be a silica pigment. Silica pigment includes but is not limited to fumed silica, silica gel, colloidal silica, or precipitated silica. In the coating formula, silica pigment could be from a single source in a powder form or in a slurry form, or a mixture of any two or more different kinds of silica particles in powder or slurry form. Silica can be used as a third pigment, in order, for examples, to improve rub resistance and reduces highlighter smear of printed sheets.

The top-coating layer further encompasses up to 25 wt % of binders. In some examples, the binder is present in an amount representing from about 2 wt % to about 25 wt %, or representing from about 4% to about 10%, by total dry weight of the top-coating layer. The binder may be any one of the binders listed above for the pre-coat layer or combinations of two or more thereof.

In some examples, the binder is a water-soluble binder or a water-dispersible binder. Some examples of such a binder are included but not limited to polyvinyl alcohol or derivatives thereof, polyethylene glycol or derivatives thereof, polyurethane, polyvinylpyrrolidone, starch or derivatives thereof, gelatin or derivatives thereof, cellulose or derivatives thereof, maleic anhydride polymers or copolymers, acrylic ester polymer and copolymers, polymethylacrylate or copolymers, polyacrylamide, latex resin materials based on polymers or copolymers of styrene butadiene, acrylic, styrene acrylic, styrene methylacrylate, styrene acrylonitrile, styrene/maleic anhydride, vinyl acrylic, vinyl acetate, vinyl esters, vinyl ethers, or a mix of any of them.

In addition, the top-coating layer formulations might also contain other components, as necessary, to carry out the required mixing, coating, manufacturing, and other process steps, as well as to satisfy other requirements of the finished product, depending on its intended use. The top-coating layer might thus further contain other components such as surfactants, binders, defoamers, optical brighteners, dyes, pH controlling agents, and any other components suitable for forming the coating layer on paper substrate.

The top-coating layer can encompass one or more optical brightening agents (OBA). The amount of OBA in the top-coating layer is sufficient or effective to enhance the brightness of said top-coating layer. The amount of OBA is in the range of about 0.01 wt % to about 0.5 wt %, or in the range of about 0.1 wt % to about 0.5 wt % by total dry weight of the top-coating layer.

The top-coating layer of the printable recording media can have a water retention Value (WRV) that is below 220 gsm, or below 180 gsm, or below 170 gsm, or below 160 gsm as measured using AAGWR (Abo Akademi Gravimetric Water Retention) as per Tappi Standard (T-701). In some examples, the top-coating layer of the printable recording media has a water Retention Value (WRV) that is below 170 gsm. The top-coating layer of the printable recording media can have an Hercules high shear viscosity (HHSV) that is below 75 cps, or below 70 cps, or below 65 cps, or below 60 cps at 25° C. (when measured using Hercules hi-shear viscometer, Model DV-10 at 4400 rpm using E-bob, ramp rate of 20 s). In some other examples, the top-coating layer of the printable recording media has an Hercules high shear viscosity (HHSV) that is below 65 cps. In yet some other examples, the top-coating layer of the printable recording media has a water Retention Value (WRV) that is below 160 gsm and an Hercules high shear viscosity (HHSV) that is below 60 cps.

Method for Producing the Media

In some examples, according to the principles described herein, a method of making a printable recording media (100) with a substrate (110) having a pre-coat layer (120) and a top coat-layer (130) is provided. The pre-coat layer (120) includes more than about 60 wt % of one or more inorganic pigments by total dry weight of said pre-coat layer. the top-coating layer (130) includes more than about 60 wt % of one or more inorganic pigments; up to 25 wt % of binders and up to about 5 wt % of a combination of natural and synthetic rheology modifiers, by total weight of the top-coating layer, wherein the ratio of the amount of natural rheology modifiers to the amount of synthetic rheology modifiers is from about 90:10 to about 50:50.

Such method encompasses providing a substrate (110); applying a pre-coat layer (120), including more than about 60 wt % of one or more inorganic pigments by total dry weight of said pre-coat layer on, at least, one side of the substrate; applying, at least, one top-coating layer (130), over the pre-coat layer, that includes more than about 60 wt % of one or more inorganic pigments; up to 25 wt % of binders and up to about 5 wt % of a combination of natural and synthetic rheology modifiers, by total weight of the top-coating layer, wherein the ratio of the amount of natural rheology modifiers to the amount of synthetic rheology modifiers is from about 90:10 to about 50:50; and drying and calendaring said pre-coat layer (120) and top-coating layer (130). In some examples, the pre-coat layer (120) and the top-coating layer (130) are applied to both sides of the substrate.

Both the pre-coat layer (120) and the top-coating layer (130) can be applied to the substrate (110) by using one of a variety of suitable coating methods, for example blade coating, air knife coating, metering rod coating, size press, curtain coating, or another suitable technique. In some examples, the pre-coat and top-coating layers can be applied in one single production run, i.e. a pre-coat is applied on a substrate and dried, and then the top-coating layer is applied on this pre-coat in the same production run and then dried. In some other examples, the pre-coat and top-coating layers are be applied in one single production run simultaneously before drying, i.e. the pre-coat and the top-coating layers are applied on the substrate in the same production run and are then dried. In yet some other examples, the pre-coat layer and top-coating layers are applied in separated production run. When the pre-coat layer and the top-coating layer are present on both sides of the substrates, depending on set-up of production machine in a mill, both sides of the substrate may be coated during a single manufacture pass, or each side is coated in a separate pass.

In some examples, the pre-coat layer (120) is coated using an offline coater, or applied during raw base paper making process. The top-coating layer (130) can be applied using in line or offline coater such as blade coater, roll coater, slot, or curtain coater. The coat layer can then be dried by convection, conduction, infrared radiation, atmospheric exposure, or other known method.

In some examples, after the coating step, the media might go through a drying process to remove water and other volatile components present in the coating layers and substrate. The drying pass may comprise several different drying zones, including, but not limited to, infrared (IR) dryers, hot surface rolls, and hot air floatation boxes.

After coating the base stock with pre-coat layer (120) and top-coating layer (130), a calendaring process can be used to achieve desired gloss or surface smoothness. The calendaring device can be a separate super calendaring machine, an on-line soft nip calendaring unit, an off-line soft nip calendaring machine, or the like. Super-calendering is calendering in a calender unit in which nips are formed between a smooth-surface press roll, such as a metal roll, and a roll covered with a resilient cover, such as a polymer roll. The resilient-surface roll adapts itself to the contours of the surface of paper and presses the opposite side of paper evenly against the smooth-surface press roll. Any of a number of calendering devices and methods can be used. The calendering device can be a separate super-calendering machine, an on-line calendaring unit, an off-line soft nip calendaring machine, or the like. Some calendering systems do not require the paper to be as completely dried as other forms of calendering. In some examples, the calendering is carried out at a temperature ranging from about 50 to about 220° C. (metal roll surface temperature) and, in some other examples, from about 100 to about 170° C. The nip pressure can be any value between about 50 to about 300 Kg/cm². The roughness, of the printable recording media, after calendar process can be less than 6 μm, or less than 3 μm, per Park Print Surface method (PPS method).

In some examples, the pre-coat layer is associated with the print media. The phrase "associated with" means that a layer is, for example, formed on, coated on, adsorbed on or absorbed in at least one surface of the print media substrate. The association between a layer and a surface of the print media substrate is achieved by bringing the substrate and composition forming the layer into contact by, for example, spraying, dipping and coating (including, e.g., roll, blade, rod, slot die, or curtain coating).

When the print media substrate is base paper stock, the composition for forming the pre-coat layer can be applied on the base paper stock by an in-line surface size press process such as a puddle-sized press or a film-sized press, for example. In addition to in-line surface sizing processing, off-line coating technologies can also be used to apply the composition for forming the pre-coat layer to the print media substrate. Examples of suitable coating techniques include, but are not limited to, slot die coaters, roller coaters, fountain curtain coaters, blade coaters, rod coaters, air knife coaters, gravure applications, and air brush applications, for example.

Method for Producing Printed Images

The method for producing printed images, or printing method, includes providing a printable recording media such as defined herein; applying an ink composition on the top-coating layer of said print media, to form a printed image; and drying the printed image, to provide a printed image with enhanced quality and enhanced image permanence. In some examples, the print speed of the printing method is more than about 50 feet per minute (fpm). In some other examples, the ink composition is applied onto the recording media via inkjet nozzles.

The printable recording media contains a substrate; a pre-coat layer including more than about 60 wt % of one or more inorganic pigments by total dry weight of said pre-coat layer; a top-coating layer including more than about 60 wt % of one or more inorganic pigments; up to 25 wt % of binders and up to about 5 wt % of a combination of natural and synthetic rheology modifiers, by total weight of the top-coating layer, wherein the ratio of the amount of natural rheology modifiers to the amount of synthetic rheology modifiers is from about 90:10 to about 50:50.

Figure 3:
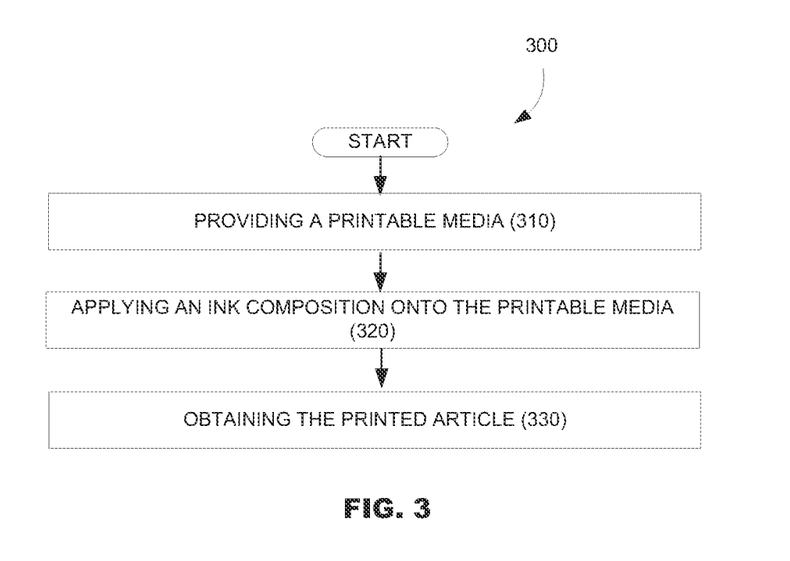
FIG. 3 is a flowchart illustrating the method for producing images according to some examples of the present disclosure.

An example of the printing method (300) in accordance with the principles described herein, by way of illustration and not limitation, is shown in FIG. 3. FIG. 3 illustrates examples of the printing method that encompasses providing (310) a printable recording media, applying an ink composition (320) onto said a printable recording media and obtaining a printed article (330).

In some examples, the printing method for producing images is an inkjet printing method. By inkjet printing method, it is meant herein a method wherein a stream of droplets of ink is jetted onto the recording substrate or media to form the desired printed image. The ink composition may be established on the recording media via any suitable inkjet printing technique. Examples of inkjet method include methods such as a charge control method that uses electrostatic attraction to eject ink, a drop-on-demand method which uses vibration pressure of a piezo element, an acoustic inkjet method in which an electric signal is transformed into an acoustic beam and a thermal inkjet method that uses pressure caused by bubbles formed by heating ink. Non-limitative examples of such inkjet printing techniques include thus thermal, acoustic and piezoelectric inkjet printing. In some examples, the ink composition is jetted onto the recording media using an inkjet nozzle and/or an inkjet printhead. In some other examples, the ink composition is applied onto the recording method using thermal inkjet printheads.

The printing method described herein can be a high-speed printing method. By high speed, it is meant a method capable of printing at a speed of more than 50 of feet per minute (fpm). The web-speed could be from about 100 to about 4 000 feet per minute (fpm). In some other examples, the printing method is a printing method capable of printing from about 100 to about 1 000 feet per minute. In yet some other examples, the printing method is capable of printing at a web-speed of more than about 200 feet per minute (fpm).

In some example, the printing method is a high-speed web press printing method. As "web press", it is meant herein that the printing technology encompasses an array of inkjet nozzles that span the width of the paper web. The array is thus able, for example, to print on 20", 30", and 42" wide web or on rolled papers.

In some examples, the printing method as described herein prints on one-pass only. The paper passes under each nozzle and printhead only one time as opposed to scanning type printers where the printheads move over the same area of paper multiple times and only a fraction of total ink is use during each pass. The one-pass printing puts 100% of the ink from each nozzle/printhead down all at once and is therefore more demanding on the ability of the paper to handle all of the ink in a very short amount of time.

As mentioned above, a print media in accordance with the principles described herein may be employed to print images on one or more surfaces of the print media. In some examples, the method of printing an image includes depositing ink that contains colorants. A temperature of the print media during the printing process is dependent on one or more of the nature of the printer, for example. Any suitable printer may be employed such as, but not limited to, offset printers and inkjet printers. In some examples, the printer is a HP T350 Color Inkjet Webpress printer (Hewlett Packard Inc.). The printed image may be dried after printing. The drying stage may be conducted, by way of illustration and not limitation, by hot air, electrical heater or light irradiation (e.g., IR lamps), or a combination of such drying methods. In order to achieve best performances, it is advisable to dry the ink at a maximum temperature allowable by the print media that enables good image quality without deformation. Examples of a temperature during drying are, for examples, from about 60° C. to about 205° C., or from about 120° C. to about 180° C. The printing method may further include a drying process in which the solvent (such as water), that can be present in the ink composition, is removed by drying. As a further step, the printable recording media can be submitted to a hot air drying systems. The printing method can also encompass the use of a fixing agent that will retain with the pigment, present in the ink composition that has been jetted onto the media.

EXAMPLES

Ingredients:

TABLE 1

| Ingredient name | Nature of the ingredient | supplier |
| --- | --- | --- |
| Opacarb ®A40 | precipitated calcium carbonate pigment (average particle size of 0.4 μm) | BASF |
| Kaocal ® | calcined clay | Thiele Kaolin Company |
| GenCryl ®PT9619 | water-dispersible latex binder | Omnova |
| Mowiol ®4-98 | water-soluble polymer-polyvinyl alcohol | Sigma-Aldrich |
| Deairex ®3040 | defoamer | Ashland |
| Sunrez ®700M | cross-linker | Omnova Solutions |
| Dispex ®N40V | Dispersant | BASF |
| Hydribrite ®TS100 | Optical Brightener | Hydrite Chemical |
| EkaFlow ®L265 | rheology modifier - polyacrylate polymer | Eka Chemicals |
| Hydroxyethyl cellulose | natural rheology modifier | Sigma Aldrich |
| Sterocoll ® FS | rheology modifier - anionic dispersion of ethyl acrylate-carboxylic acid copolymer | BASF |
| Rheocarb ®101 | Rheology modifier - acrylic copolymer | Coatex Arkema Group |
| Sodium Alginate | Natural rheology modifier (gum) | Sigma Aldrich |
| GenFlo ®5068 | Latex binder | Omnova |
| Clineo ®715 | Starch binder | ADM |
| Sterocoll ®802 | Thickener | BASF |

Example 1—Coating Layer Formulations

The formulations of the pre-coat layer (120) and of the top-coating layer (130) of the printable recording media (100) are expressed in Table 2. The numbers represent the parts of each component present in each layer based on 100 parts of inorganic pigments and the weight percent (wt %) based on the total weight of each coating layer.

Master batches compositions of the top-coating layer are made without any rheology modifiers in a beaker by using normal bench-top mixing equipment. Then, the master batch composition is split in several small compositions that are spiked with different rheology modifiers at pre-determined level. The formulations of the master batch top-coating layer are expressed in the Table 2. Different top-coating formulations A to K are made using different amount and rheology modifiers; the amount and nature of rheology modifiers are expressed in Table 3. The numbers in Table 3 represent the weigh percent of each component (rheology modifiers), present in top-coating layer, by total weight of the top-coating layer.

TABLE 2

| Pre-coat layer composition (120) | | |
| --- | --- | --- |
| Ingredients | parts | Wt % |
| Kaocal ® | 60 | 51.7% |
| Opacarb ® A40 | 40 | 34.4% |
| GenFlo ® 5068 | 11.6 | 10.0% |
| Clineo ® 715 | 3.5 | 3.0% |
| Sterocoll ®802 | 0.93 | 0.80% |
| Deairex ® 3040 | 0.09 | 0.1% |
| Total | 116.12 | 100.0% |

| Master batch top-coating layer composition (130) | | |
| --- | --- | --- |
| Ingredients | parts | Percent |
| Opacarb ® A40 | 70 | 64.6 |
| Dispex ®N40V | 0.05 | 0.046 |
| Kaocal ® | 30 | 27.7 |
| GenCryl ®PT9619 | 7 | 6.46 |
| Mowiol ® 4-98 | 0.5 | 0.46 |
| Hydribrite ®TS100 | 0.08 | 0.07 |
| Sunrez ® 700M | 0.25 | 0.23 |
| Deairex ® 3040 | 0.5 | 0.46 |
| Rheology Modifier | see Table 3 | see Table 3 |
| Total Parts | 108.38 | 100.0 |

TABLE 3

| Top-Coating Samples | Master Batch coating | Eka Flow ® L-265 | Hydroxyethyl-cellulose | Sterocoll ® FS | Rheocarb ® 101 | Sodium Alginate | Total Percent |
|---|---|---|---|---|---|---|---|
| A | 100.00 | 0 | 0 | 0 | 0 | 0 | 100.00 |
| B | 99.89 | 0.11 | 0 | 0 | 0 | 0 | 100.00 |
| C | 99.77 | 0.23 | 0 | 0 | 0 | 0 | 100.00 |
| D | 99.54 | 0.46 | 0 | 0 | 0 | 0 | 100.00 |
| E | 99.66 | 0.11 | 0.23 | 0 | 0 | 0 | 100.00 |
| F | 99.54 | 0.23 | 0.23 | 0 | 0 | 0 | 100.00 |
| G | 99.43 | 0.11 | 0.46 | 0 | 0 | 0 | 100.00 |
| H | 99.54 | 0 | 0 | 0.46 | 0 | 0 | 100.00 |
| I | 99.54 | 0 | 0 | 0 | 0.46 | 0 | 100.00 |
| J | 99.09 | 0 | 0 | 0 | 0.91 | 0 | 100.00 |
| K | 99.54 | 0 | 0 | 0 | 0 | 0.46 | 100.00 |

Example 2—Printable Recording Media

Series of coated media samples are prepared with coating compositions as shown in the Tables 2 and 3: the pre-coating layer composition (120) as exemplified in Table 2 is applied to both sides of a raw base paper (110) (a wood free grade type of paper) using a metering size press, and then dried. The top-coating layer compositions (130), as exemplified in Tables 2 and 3, are applied to both sides on the media (100) over the pre-coat layers (120) using a Mayer rod and then dried. The media are then calendered through a two-nip soft nip calendering machine (at 100 kN/m, 54.4° C. (130° F.)) in order to obtain the coated printable recording media (1) to (11).

In each printable recording media samples (1) to (11), the pre-coat layer composition is applied at a coat-weigh of 7 gsm per side (solid target of 56%) and the different top-coating layers A to K are applied at a coat-weigh of 15 gsm, per side, as illustrated in Table 4, in order to obtain the coated printable recording media (1) to (11).

TABLE 4

| Recording media sample # | Pre-coat layer (120) coat-weight (in gsm per side) | Top-coating layer composition (130) coat-weight (in gsm per side) | | | | | | | | | | |
|---|---|---|---|---|---|---|---|---|---|---|---|---|
| | | A | B | C | D | E | F | G | H | I | J | K |
| (1) | 7 | 15 | | | | | | | | | | |
| (2) | 7 | | 15 | | | | | | | | | |
| (3) | 7 | | | 15 | | | | | | | | |
| (4) | 7 | | | | 15 | | | | | | | |
| (5) | 7 | | | | | 15 | | | | | | |
| (6) | 7 | | | | | | 15 | | | | | |
| (7) | 7 | | | | | | | 15 | | | | |
| (8) | 7 | | | | | | | | 15 | | | |
| (9) | 7 | | | | | | | | | 15 | | |
| (10) | 7 | | | | | | | | | | 15 | |
| (11) | 7 | | | | | | | | | | | 15 |

Example 3—Printable Recording Media Performances

An identical image sequence is printed on the printable media samples 1 to 11, using a Edgeline printer (Hewlett Packard Inc.). Such printer contains printheads filed with A50 pigment based inks. The different recording media samples (1 to 11) are measured for different parameters and properties. Such parameters and properties are expressed in the Tables 5 and 6 below.

In Table 5, the solid (wt %) content is measured using a CEM Microwave. BRV (cps) is the Brookfield viscosity expressed in cps and measured using a Brookfield DVII Viscometer at 100 rpm. WRV is the "Water Retention Value" (WRV), is expressed in gsm and is measured using AAGWR (Abo Akademi Gravimetric Water Retention) as per Tappi Standard (T-701). The lower WRV is better for the coating operations. HHSV, Hercules high shear viscosity, is expressed in cps and is measured using Hercules hi-shear viscometer, Model DV-10 at 4400 rpm using E-bob, ramp rate of 20 s.

TABLE 5

| Recording media samples | Solids (wt %) | BRV (cps) | WRV (gsm) | HHSV (cps) | pH |
|---|---|---|---|---|---|
| (1) | 60.1 | 594 | 441 | 45 | 8.73 |
| (2) | 60.2 | 1014 | 234 | 59 | 8.55 |
| (3) | 60.2 | 1578 | 177 | 76 | 8.46 |
| (4) | 57.2 | 2741 | 135 | 57 | 8.60 |
| (5) | 60.5 | 2393 | 167 | 75 | 8.40 |
| (6) | 57.0 | 2561 | 155 | 48 | 8.46 |
| (7) | 57.1 | 2519 | 152 | 57 | 8.37 |

TABLE 5-continued

| Recording media samples | Solids (wt %) | BRV (cps) | WRV (gsm) | HHSV (cps) | pH |
|---|---|---|---|---|---|
| (8) | 60.7 | 1165 | 158 | 83 | 8.56 |
| (9) | 60.1 | 882 | 321 | 46 | 8.53 |
| (10) | 59.9 | 906 | 256 | 46 | 8.41 |
| (11) | 60.7 | 1356 | 325 | 63 | 8.59 |

Gamut Measurement (Gamut) represents the amount of color space covered by the ink on the media. Gamut volume is calculated using L*a*b* values of 8 colors (cyan, magenta, yellow, black, red, green, blue, white) measured with an X-RITE® 939 Spectro-densitometer (X-Rite Corporation), using D65 illuminant and 2° observer angle.

L*min value testing is carried out on a black printed area and is measured with an X-RITE® 939 Spectro-densitometer, using D65 illuminant and 2° observer angle. This measure determines how "black" the black color is. A lower score indicates a better performance.

The black optical density (KOD) measures the reflectance of the area filled using an X-RITE®939 Spectro-densitometer. The higher the KOD value is, the darker the black colored image is obtained.

Bleed testing is carried out with a bleed stinger pattern. 1016 micron lines (or 40 mil, where 1 mil=$1/1000^{th}$ of an inch) of cyan, magenta, yellow, black, red, green, blue inks, passing through solid area fills of each color, are printed and scanned. The bleed is evaluated visually for acceptability.

The "Sheet Gloss" measures how much light is reflected with 75 degree geometry on an unprinted media. 75° Sheet Gloss testing is carried out by Gloss measurement of the unprinted area of the sheet with a BYK-Gardner MICRO-GLOSS 75° Meter (BYK-Gardner USA). The "Image Gloss" measures the gloss of each color. 75° Image Gloss testing is carried out by Average 75° gloss measurement of 8 colors (cyan, magenta, yellow, black, red, green, blue, and white) measured with the BYK-Gardner MICRO-GLOSS® 75° Meter (BYK-Gardner).

TABLE 6

| Recording media samples | Bleed (Visual Ranking) | Sheet Gloss | Gamut | L * min | KOD | Image Gloss |
|---|---|---|---|---|---|---|
| (1) | Control | 68.3 | 303867 | 12.46 | 1.88 | 81.93 |
| (2) | Good | 67.5 | 296636 | 13.1 | 1.85 | 81.8 |
| (3) | Good | 66.8 | 314771 | 9.9 | 1.93 | 82.1 |
| (4) | poor | 65.4 | 323577 | 11.3 | 1.86 | 80.9 |
| (5) | Good | 65.5 | 295793 | 11.7 | 1.83 | 78.9 |
| (6) | poor | 65.6 | 323469 | 10.3 | 1.85 | 81.4 |
| (7) | Good | 64.4 | 313162 | 12.4 | 1.87 | 78.2 |
| (8) | Good | 67.3 | 325333 | 8.9 | 1.95 | 85.3 |
| (9) | Very good | 66.3 | 323524 | 10.2 | 1.90 | 80.8 |
| (10) | Good | 64.5 | 312084 | 9.5 | 1.90 | 77.3 |
| (11) | Good | 66.0 | 333722 | 10.4 | 1.92 | 80.1 |

The printable recording media such as described herein have acceptable bleed performances, while having in the same time good sheet and image gloss, good KOD as well as a low Water Retention Value (WRV) and a low Hercules high shear viscosity (HHSV).

The invention claimed is:

1. A printable recording media, comprising:
   a. a substrate;
   b. a pre-coat layer including more than about 60 wt % of one or more inorganic pigments by total dry weight of said pre-coat layer; and
   c. a top-coating layer including:
      i. more than about 60 wt % of one or more inorganic pigments;
      ii. up to 25 wt % of binders;
      iii. and up to about 5 wt % of a combination of natural and synthetic rheology modifiers, by total weight of said top-coating layer, wherein the ratio of the amount of natural rheology modifiers to the amount of synthetic rheology modifiers is from about 90:10 to about 50:50.

2. The printable recording media of claim 1 wherein the combination of natural and synthetic rheology modifiers, in the top-coating layer, are present in an amount representing from about 0.1 wt % to 1.5 wt % by total weight of said top-coating layer.

3. The printable recording media of claim 1 wherein, in the top-coating layer, the ratio of the amount of natural rheology modifiers to the amount of synthetic rheology modifiers is from about 85:15 to about 70:30.

4. The printable recording media of claim 1 wherein the natural rheology modifiers, in the top-coating layer, are hydroxy-ethylcelluloses.

5. The printable recording media of claim 1 wherein the synthetic rheology modifiers, in the top-coating layer, are hydrophobically modified alkali soluble emulsion polymer systems.

6. The printable recording media of claim 1 wherein, in the top-coating layer, the natural rheology modifiers are hydroxy-ethylcellulose and the synthetic rheology modifiers are hydrophobically modified alkali soluble emulsion polymer systems.

7. The printable recording media of claim 1 wherein the top-coating layer has a Water Retention Value (WRV) that is below 170 gsm.

8. The printable recording media of claim 1 wherein the top-coating layer has an Hercules high shear viscosity (HHSV) that is below 65 cps.

9. The printable recording media of claim 1 wherein the top-coating layer comprises a mixture of about 30 to about 90 wt % of a first pigment including calcium carbonate particles and of about 10 to about 70 wt % of calcined clay as a second pigment, wherein said weight percentages are by combined weight of the first and second pigments by total dry weight of said top-coating layer.

10. The printable recording media of claim 1 wherein the inorganic pigments, present in the pre-coat layer, are combinations of calcined clay and ground calcium carbonate.

11. The printable recording media of claim 1 wherein the inorganic pigments, present in the pre-coat layer, are combinations of calcined clay and precipitated calcium carbonate.

12. The printable recording media of claim 1 wherein the pre-coat layer further comprises one or more binder in an amount representing from of about 2 wt % to about 25 wt % by total dry weight of the pre-coat layer.

13. The printable recording media of claim 1 wherein the coat-weight of the pre-coat layer, on a side of the printable recording media, is of about 5 to about 20 gsm and the coat-weight of the top-coating layer, on the same side of the printable recording media, is of about 10 to about 30 gsm.

14. An article, comprising:
   a. a first layer including inorganic pigments; and
   b. a second layer including from about 0.1 wt % to 1.5 wt % of a combination of hydroxy-ethylcellulose and modified alkali soluble emulsion polymer systems, by total weight of said second layer, wherein the ratio of the amount of hydroxy-ethylcellulose to the amount of modified alkali soluble emulsion polymer systems is from about 85:15 to about 70:30.

15. A method for making a printable recording material, comprising:
   a. providing a substrate;
   b. applying a pre-coat layer including more than about 60 wt % of one or more inorganic pigments by total dry weight of said pre-coat layer on, at least, one side of the substrate;
   c. applying, at least, one top-coating layer over said pre-coat layer, that includes more than about 60 wt % of one or more inorganic pigments; up to 25 wt % of binders; and up to about 5 wt % of a combination of natural and synthetic rheology modifiers, by total weight of said top-coating layer, wherein the ratio of the amount of natural rheology modifiers to the amount of synthetic rheology modifiers is from about 90:10 to about 50:50;

d. and drying and calendaring said layers.

\* \* \* \* \*

UNITED STATES PATENT AND TRADEMARK OFFICE
CERTIFICATE OF CORRECTION

PATENT NO. : 9,962,983 B2
APPLICATION NO. : 15/119536
DATED : May 8, 2018
INVENTOR(S) : Lokendra Pal et al.

It is certified that error appears in the above-identified patent and that said Letters Patent is hereby corrected as shown below:

On the Title Page

In item (57), Abstract, in Column 2, Line 4, delete "topcoating" and insert -- top-coating --, therefor.

Signed and Sealed this
Sixth Day of November, 2018

Andrei Iancu
*Director of the United States Patent and Trademark Office*